United States Patent
Ishitobi et al.

(10) Patent No.: US 6,757,754 B2
(45) Date of Patent: Jun. 29, 2004

(54) DATA TRANSFER UNIT FOR RECEIVING GENERAL PURPOSE COMMANDS WHEN NO EXPEDITED COMMAND IS ARRIVING

(75) Inventors: Yuusai Ishitobi, Fukushima-ken (JP); Naoto Yamamoto, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 52 days.

(21) Appl. No.: 10/313,194

(22) Filed: Dec. 6, 2002

(65) Prior Publication Data

US 2003/0115399 A1 Jun. 19, 2003

(30) Foreign Application Priority Data

Dec. 13, 2001 (JP) ........................................ 2001-380001

(51) Int. Cl.⁷ ............................. G06F 1/04; G06F 1/14; G06F 3/00
(52) U.S. Cl. .......................... 710/45; 710/40; 713/502; 713/500
(58) Field of Search .............................. 710/5, 40, 36, 710/316, 45; 370/431, 433, 438; 713/400, 500, 502

(56) References Cited

U.S. PATENT DOCUMENTS 5,991,829 A * 11/1999 Giorgio et al. ............... 710/15
6,532,512 B1 * 3/2003 Torii et al. .................. 710/316
2002/0090977 A1 * 7/2002 Chen ........................... 455/557

FOREIGN PATENT DOCUMENTS

JP 10-98501 A1 4/1998

* cited by examiner

Primary Examiner—Kim Huynh
(74) Attorney, Agent, or Firm—Brinks Hofer Gilson & Lione

(57) ABSTRACT

A data transfer unit is provided which reliably receives the expedited command when the expedited command has arrived, and changes over the reception to receiving a general purpose command when no expedited command is arriving. The data transfer unit contains a data module having at least a command module, and first and second interfaces and first and second host control units. An expedited command output at an indefinite period from the first host control unit is fed to the data module through the first interface. The first interface is turned off and the second interface is turned on at all times when a general purpose command output at a predetermined period from the second host control unit is fed to the command module through the second interface. The first interface is turned on and the second interface is turned off by interface change-over signals of an active level fed to the data module just before the first host control unit produces the expedited command.

5 Claims, 3 Drawing Sheets

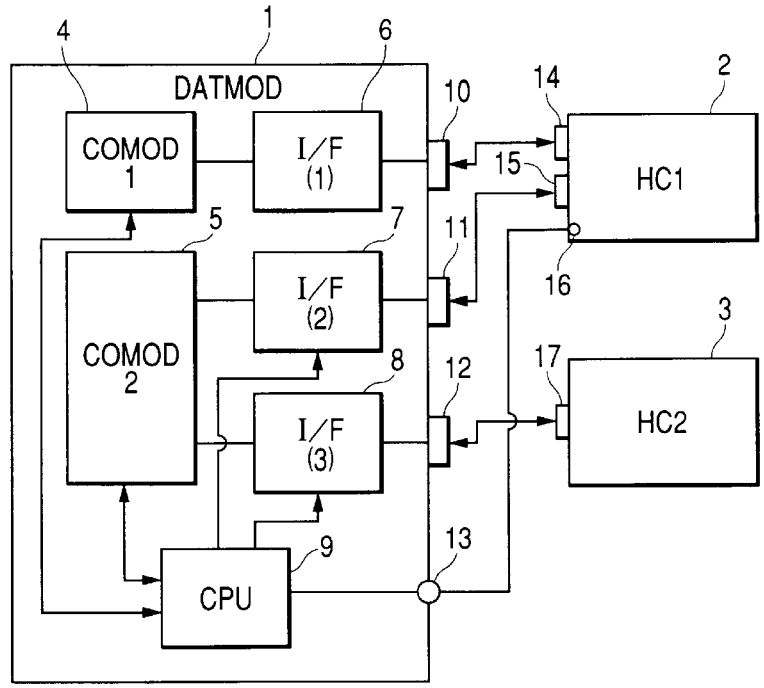

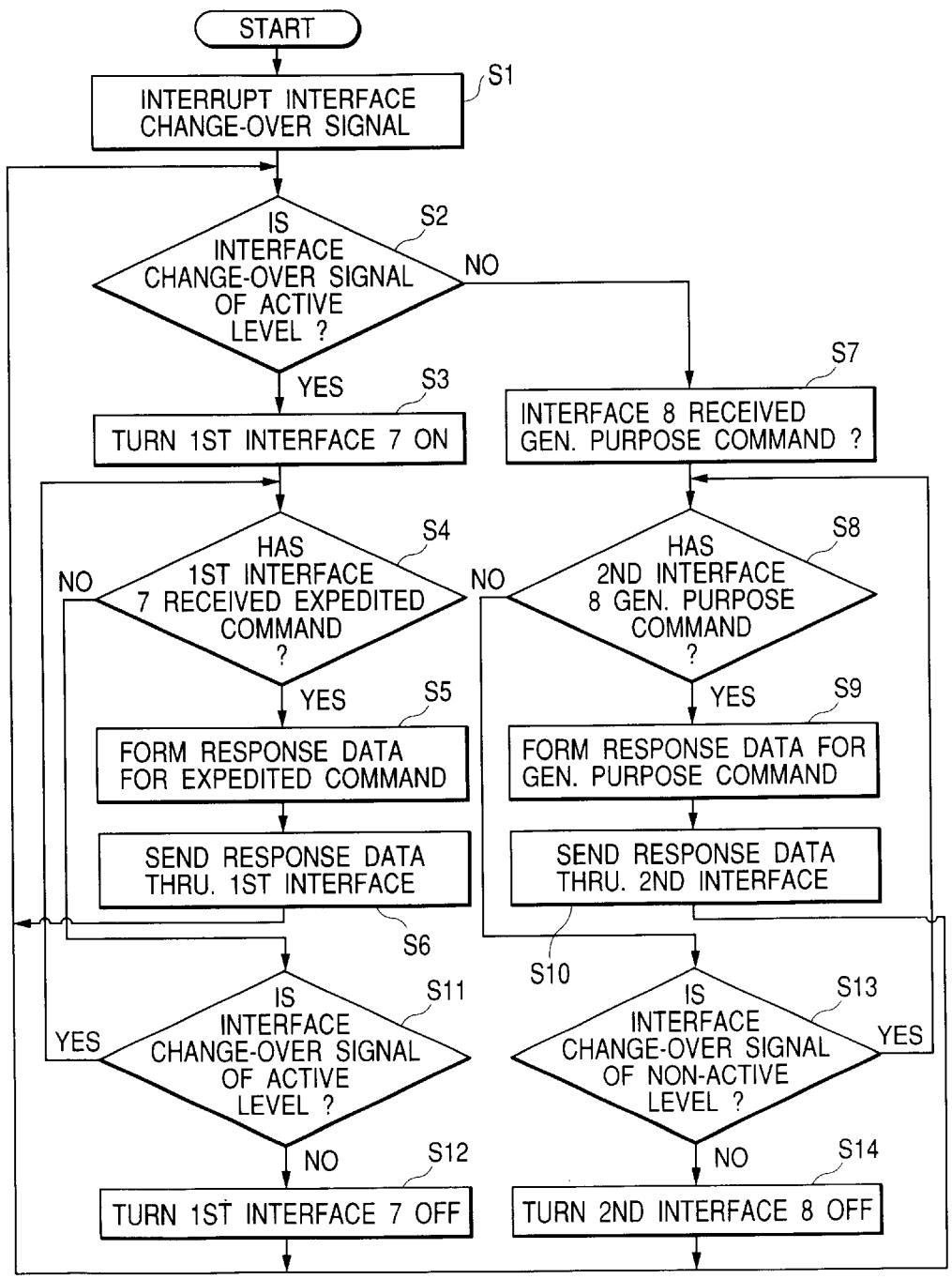

DATA TRANSFER UNIT FOR RECEIVING GENERAL PURPOSE COMMANDS WHEN NO EXPEDITED COMMAND IS ARRIVING

BACKGROUND OF THE INVENTION

1. Field of the Invention

This invention relates to a data transfer unit. More specifically, the invention relates to a data transfer unit which connects a data module to a plurality of host control units and which, when various commands are fed to the data module from the plurality of host control units, enables the data module to effectively receive these commands.

2. Description of the Related Art

In a cell phone employing the code division multiplex access (CDMA) system, it is an accepted practice to constitute a data transfer unit by connecting host control units constituted by a plurality of personal computers to a data module, and to feed various kinds of separate commands to the data module from the host control units, so that various data corresponding to the commands that are fed are processed in the data module.

FIG. 4 is a block diagram schematically illustrating a known data transfer unit in a state where two host control units are connected to a data module.

Referring to FIG. 4, the data transfer unit comprises a data module (DAT MOD) 41, a first host control unit (HC1) 42, and a second host control unit (HC2) 43. In this case, the data module 41 includes a first command module (COMOD 1) 44, a second command module (COMOD 2) 45, a first interface {I/F(1)} 46, a first on/off controllable interface {I/F(2)} 47, a second on/off controllable interface {I/F(3)} 48, a control unit (CPU) 49, a first connector 50, a second connector 51, and a third connector 52. Further, the first host control unit 42 includes a first connector 53 and a second connector 54, and the second host control unit 3 includes a connector 55.

The first command module 44, second command module 45, first interface 46, first on/off controllable interface 47, second on/off controllable interface 48, control unit 49, first connector 50, second connector 51, and third connector 52 are connected in the data module 41 in a manner as shown in FIG. 4. The first connector 50 and the first connector 53, the second connector 51 and the second connector 54, and the third connector 52 and the connector 55, are connected together through transfer lines (having no reference numerals), respectively.

The data transfer unit constituted as described above operates as described below.

The first host control unit 42 and the second host control unit 43 generate dedicated commands (request packet data), respectively, and the dedicated commands that are generated are fed to the data module 41. Here, the first host control unit 42 generates a relatively important dedicated command (hereinafter referred to as expedited command) of an indefinite period representing the switching operation or the change-over of transmission/reception, and the second host control unit 43 generates a general purpose dedicated command (hereinafter referred to as general purpose command) every predetermined period $T_0$, i.e., every 500 msec. In the data module 41, the control unit 49 works to preferentially turn on the first on/off controllable interface 47 and to turn off the second on/off controllable interface 48 to monitor the arrival of the expedited command, so as to preferentially receive the expedited command fed from the first host control unit 42. When no expedited command has arrived but a general purpose command has arrived, the control unit 49 turns the second on/off controllable interface 48 on and turns the first on/off controllable interface 47 off.

FIG. 5 is a diagram of a waveform illustrating a state where a command is received by the data module 41 when an expedited command and a general purpose command are fed to the data module 41 in the data transfer unit illustrated in FIG. 4.

In FIG. 5, the abscissa represents the time and the ordinate represents the command waveform that is normally received by the data module 41. Here, black dots appearing on the time axis every predetermined period $T_0$ represent a period for feeding a general purpose command, the upper side of the center line in the command waveform represents an expedited command waveform and the lower side of the center line represents a general purpose command waveform.

Referring to FIG. 5, the data module 41 that is fed with an expedited command from the first host control unit 42 during the period of from time $t_0$ to time $t_1$, permits the expedited command to be fed to the second command module 45 through the first on/off controllable interface 47 that has been turned on, whereby the second command module 45 processes the expedited command and transmits a response command (response packet data) to the first host control unit 42. During this period, the general purpose command is fed twice from the second host control unit 43. Here, however, since the second on/off controllable interface 48 has been turned off, the second command module 45 does not receive the general purpose commands and, hence, no response command is transmitted to the second host control unit 43.

Next, when the general purpose command is fed from the second host control unit 43 during the period of from time $t_2$ to time $t_3$, the data module 41 permits the general purpose command to be fed to the second command module 45 through the second on/off controllable interface 48 that has been turned on at the moment $t_2$, whereby the second command module 45 processes the general purpose command and transmits a response command to the second host control unit 43.

Next, when the general purpose command is fed again from the first host control unit 42 during the period of from time $t_4$ to time $t_5$, the data module 41 permits the expedited command to be fed to the second command module 45 through the first on/off controllable interface 47 that has been turned on at the moment $t_4$, whereby the second command module 45 processes the expedited command and transmits a response command to the first host control unit 42. During this period, the general purpose command is fed four times from the second, host control unit 43. Here, however, since the second on/off controllable interface 48 has been turned off, the second command module 45 does not receive the general purpose commands and, hence, no response command is transmitted to the second host control unit 43.

Then, when the general purpose command is fed from the second host control unit 43 during the period of from time $t_6$ to time $t_7$, the data module 41 permits the general purpose command to be fed to the second command module 45 through the second on/off controllable interface 48 that has been turned on at the moment $t_6$, whereby the second command module 45 processes the general purpose command and transmits a response command to the second host control unit 43.

The above known data transfer unit preferentially receives the expedited command that is fed at an indefinite period from the first host control unit 42 and does not permit such an occurrence that the expedited command is not received, but frequently permits such an occurrence that the general purpose command is not received though it has been fed maintaining a predetermined period $T_0$ from the second host control unit 43.

To avoid such an inconvenient state, means can be contrived according to which the time for monitoring the reception of the expedited command is set to be 10 seconds, and the reception is changed over to receiving the general purpose command when no expedited command is arriving even after the passage of 10 seconds. Even with this means, however, the general purpose command is not received for a period of 10 seconds of monitoring the reception of the expedited commands. The monitoring time of 10 seconds is considerably longer than the predetermined period $T_0$ which is, for example, 500 msec of the general purpose command. Therefore, the state where the general purpose command is not received accounts for a considerable proportion of the time.

SUMMARY OF THE INVENTION

This invention was accomplished in view of the above technical background and provides a data transfer unit which reliably receives the expedited command when the expedited command has arrived, and changes over the reception to receiving general purpose commands when no expedited command is arriving.

For this purpose, this invention provides a data transfer unit comprising:

a data module having at least a command module, and first and second on/off controllable interfaces; and first and second host control units; wherein an expedited command output at an indefinite period from the first host control unit is fed to the command module through the first interface;

the first interface is turned off and the second interface is turned on at all times when a general purpose command output at a predetermined period from the second host control unit is fed to the command module through the second interface; and the first interface is turned on and the second interface is turned off by an interface change-over signal of an active level fed to the data module just before the first host control unit produces the expedited command.

According to the above means, the first and second on/off controllable interfaces in the data module are so changed over that the first interface is turned off and the second interface is turned on at all times. It is therefore made possible to receive, during the change-over period, the general purpose command that is arriving at a predetermined period from the second host control unit as well as to set the interface change-over signal to assume the active level that is fed to the data module immediately before the expedited command arrives. Accordingly, the first interface is turned on and the second interface is turned off, and the expedited command from the first host control unit can be received just after the change over. Namely, the data module becomes capable of receiving and processing the expedited command without exception, and of successively receiving and processing general purpose commands in a period other than the period of receiving the expedited command. It is thus allowed to obtain a data module featuring a high command receiving efficiency.

It is further desired that the first host control unit in the above means works to set the interface change-over signal to the active level 10 msec before the expedited command is output.

According to this constitution, the change-over of the first and second interfaces has been completed based on the interface change-over signal of the active level that is fed at the time when the expedited command is fed to the data module and, hence, the expedited command can be reliably received and processed.

It is further desired that the first host control unit in the above means works to maintain the interface change-over signal at the active level while the expedited command is being output.

According to this constitution, the period of the active level of the interface change-over signal that is fed to the data module overlaps the period for feeding the expedited command. Therefore, means for changing over the first and second interfaces can be simply constituted and, besides, the change-over can be reliably accomplished to reliably receive and process the expedited command.

BRIEF DESCRIPTION OF THE DRAWINGS

FIG. 1 is a block diagram illustrating an embodiment of a data transfer unit according to the present invention, and shows the constitution of a major portion thereof;

FIG. 2 is a diagram illustrating a state of operation of when a command is received by a data module while a second expedited command and a general purpose command are being fed to the data module in the data transfer unit shown in FIG. 1;

FIG. 3 is a flowchart illustrating a major process of operation executed by the data module in the data transfer unit shown in FIG. 1;

DETAILED DESCRIPTION OF THE PREFERRED EMBODIMENT

Figure 4:
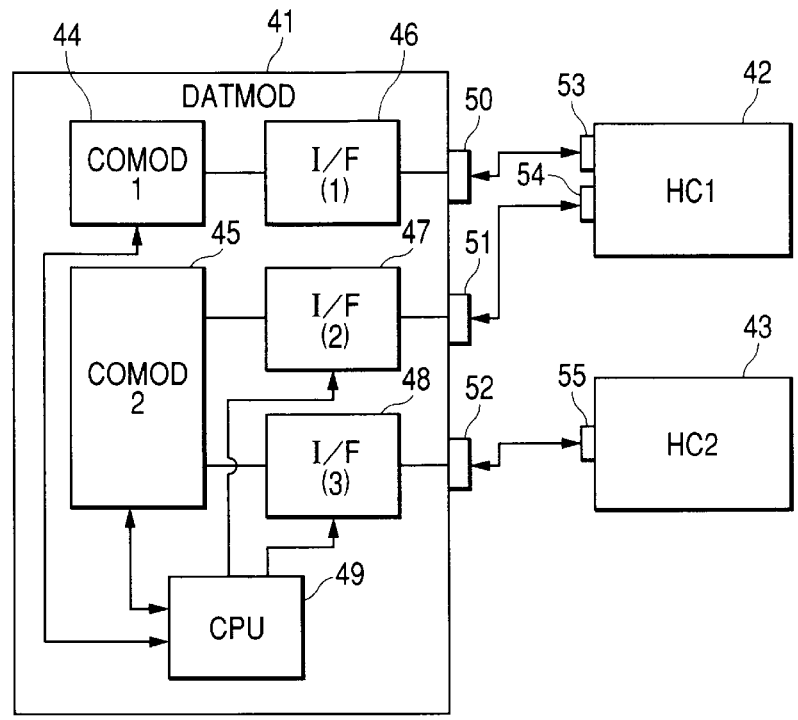
FIG. 4 is a block diagram schematically illustrating the constitution of a known data transfer unit, and shows a state where two host control units are connected to the data module.
Figure 5:
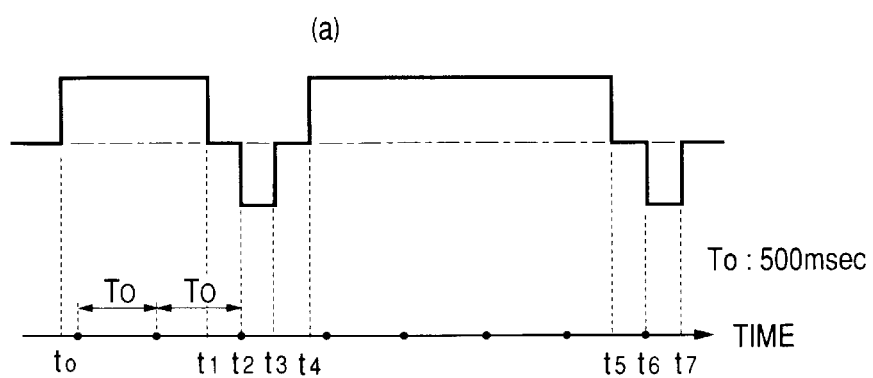
FIG. 5 is a diagram of a waveform in a state where a command is received by the data module while an expedited command and a general purpose command are being fed to the data module in the data transfer unit shown in FIG. 4.

An embodiment of the invention will now be described with reference to the drawings.

FIG. 1 is a block diagram illustrating an embodiment of a data transfer unit according to the present invention, and shows the constitution of a major portion thereof.

Referring to FIG. 1, the data transfer unit according to this embodiment includes a data module (DAT MOD) 1, a first host control unit (HC1) 2 such as a personal computer and a second host control unit (HC2) 3 such as a personal computer. Here, the data module 1 includes a first command module (COMOD1) 4, a second command module (COMOD2) 5, a first interface {I/F(1)} 6, a first on/off controllable interface {I/F(2)} 7, a second on/off controllable interface {I/F(3)} 8, a control unit (CPU) 9, a first connector 10, a second connector 11, a third connector 12 and a connection terminal 13. The first host control unit 2 has a first connector 14, a second connector 15 and a connection terminal 16, and the second host control unit 3 has a connector 17.

In the data module 1, the first command module 4 is connected to the first interface 6 and to the control unit 9.

The second command module 5 is connected to the first on/off controllable interface (hereinafter referred to as first controllable interface) 7, to the second on/off controllable interface (hereinafter referred to as second controllable interface) 8 and to the control unit 9. The first interface 6 is connected to the first connector 10. The first controllable interface 7 is connected to the second connector 11 and to the control unit 9. The second controllable interface 8 is connected to the third connector 12 and to the control unit 9. The data module 1 and the first host control unit 2 are connected together between the first connector 10 and the first connector 14, between the second connector 11 and the second connector 15, and between the connection terminal 13 and the connection terminal 16 by using transfer lines (having no reference numerals), respectively. The data module 1 and the second host control unit 3 are connected together between the third connector 12 and the connector 17 by using a transfer line (having no reference numeral).

The thus constituted data transfer unit of this embodiment operates as described below.

The first host control unit 2 and the second host control unit 3 are the same as the first host control unit 42 and the second host control unit 43 shown in FIG. 4, and generate dedicated commands (request packet data) which are, then, fed to the data module 1. Here, the first host control unit 42 generates a relatively important dedicated command (hereinafter, this dedicated command is referred to as expedited command like in the above case) of an indefinite period corresponding to the switching operation data or to the data for changing over the transmission/reception, and the second host control unit 43 generates a general purpose dedicated command (hereinafter, this dedicated command is referred to as general purpose command like in the above case) every predetermined period $T_0$, e.g., every 500 msec. Among the expedited commands generated from the first host control unit 2, the first one is fed to the data module 1 through the first connector 14 and the first connector 10. In the data module 1, this expedited command is fed to the first command module 4 through the first connector 10 and the interface 6. The second one is fed to the data module 1 through the second connector 15 and the second connector 11. In the data module 1, this expedited command is fed to the second command module 5 through the second connector 11 and the first controllable interface 7.

Here, the first expedited command output from the first host control unit 2 is fed to the first command module 4 through the first interface 6 of the non-controlled type and is processed by the first command module 4. This processing is quite the same as the one for processing the first expedited command in the known data transfer unit. Therefore, this processing is not described any further in this specification. The second expedited command, on the other hand, is specially processed by this embodiment as will be described below in detail.

FIGS. 2A to 2D are diagrams illustrating a state of operation of when a command is received by the data module 1 while the second expedited command and the general purpose command are being fed to the data module 1 in the data transfer unit shown in FIG. 1, wherein FIG. 2A illustrates a state of feeding an interface change-over signal, FIG. 2B illustrates a state of changing over the first and second controllable interfaces 7 and 8, FIG. 2C illustrates a state of feeding the second expedited command, and FIG. 2D illustrates a state of feeding the general purpose command.

In FIGS. 2A to 2D, the abscissa represents the time. Here, black dots appearing on the time axis every predetermined period $T_0$, e.g., every 500 msec represent a period for feeding the general purpose command.

The operation of the data transfer unit shown in FIG. 1 will now be described with reference to FIGS. 2A to 2D.

When the data module 1 has not substantially been fed with the interface change-over signal from the first host control unit 2 (when the interface change-over signal is at the non-active level), the control unit 9 turns the first controllable interface 7 off and turns the second controllable interface 8 on (this state is referred to as the first changed-over state). Due to the change over at times to and $t_1$, the general purpose command fed from the second host control unit 3 is transmitted to the second command module 5 unit 3 through the second controllable interface 8 that is being turned on and is processed by the second command module 5.

The interface change-over signal that is generated by the first host control unit 2 and has assumed the active level at time $t_2$ in FIG. 2A, is fed to the control unit 9 through the two connection terminals 16 and 13. In response to the interface change-over signal, the control unit 9 changes the first controllable interface 7 from the off state over to the on state and changes the second controllable interface 8 from the on state over to the off state within 10 msec from the time $t_2$ as shown in FIG. 2B (this state is referred to as the second changed-over state).

When the first host control device 2 generates, at time $t_3$, the second expedited command following the interface change-over signal of the active level as shown in FIG. 2C, the second expedited command is transferred to the second command module 5 through the first controllable interface 7 that is turned on and is processed by the second command module 5. Here, the feeding of the interface change-over signal of the active level and of the second expedited command continues from time $t_3$ to time $t_5$. The general purpose command that is fed from the second host control unit 3 at time $t_4$ which lies within this period, is blocked by the second controllable interface 8 that has been turned off and is not transferred to the second command module 5.

At time $t_6$ which is 10 msec after the time $t_5$ as shown in FIG. 2C, the first and second controllable interfaces 7 and 8 are set to the first changed-over state from the second changed-over state due to the interface change-over signal that has changed from the active level to the non-active level and is fed to the control unit 9. As the first change-over state is set, the general purpose commands fed from the second host control unit 3 are transferred at times $t_8$, $t_9$, and $t_{10}$ to the second command module 5 through the second controllable interface 8 that has been turned on and are processed by the second command module 5.

The interface change-over signal of the active level that is generated again by the first host control unit 2 at time $t_{11}$ in FIG. 2A, is fed to the control unit 9. In response to the interface change-over signal, the control unit 9 changes the first and second controllable interfaces 7 and 8 from the first changed-over state over to the second changed-over state within 10 msec from the time $t_{11}$ as shown in FIG. 2B.

When the first host control device 2 generates, at time $t_{12}$, the second expedited command following the interface change-over signal of the active level as shown in FIG. 2C, the second expedited command is transferred to the second command module 5 through the first controllable interface 7 that is turned on and is processed by the second command module 5. Here, the feeding of the interface change-over signal of the active level and of the second expedited command continues from time $t_{12}$ to time $t_{14}$. The general purpose command that is fed from the second host control unit 3 at time $t_{13}$ which lies within this period, is blocked by the second controllable interface 8 that has been turned off and is not transferred to the second command module 5.

At time $t_{15}$ which is 10 msec after the time $t_{14}$ as shown in FIG. 2C, the first and second controllable interfaces 7 and 8 are set to the first changed-over state from the second changed-over state due to the interface change-over signal that has changed from the active level to the non-active level and is fed to the control unit 9. As the first changed-over state is set, the general purpose commands fed from the second host control unit 3 are transferred at times $t_{16}$ and $t_{17}$ to the second command module 5 through the second controllable interface 8 that has been turned on and are processed by the second command module 5.

FIG. 3 is a flowchart illustrating a major process of operation executed by the data module 1 in the data transfer unit shown in FIG. 1.

The operation executed by the data module 1 will now be described based on the flowchart illustrated in FIG. 3.

At step S1, first, the control unit 9 sets an interruption for an interface change-over signal fed from the first host control unit 2.

Next, at step S2, the control unit 9 judges whether the interface change-over signal that is fed is of the active level. When it is judged that the interface change-over signal is of the active level (Y), the routine proceeds to next step S3. When it is judged that the interface change-over signal is of the non-active level (disable level) (N), the routine proceeds to another step S7.

Then, at step S3, the control unit 9 turns the first controllable interface 7 on and turns the second controllable interface 8 off (second changed-over state).

Then, at step S4, the control unit 9 judges whether the second expedited command is fed from the first host control unit 2 and is received through the first controllable interface 7. When it is judged that the second expedited command is received (Y), the routine proceeds to next step S5. When it is judged that the second expedited command has not been received (N), on the other hand, the routine proceeds to another step S11.

At step S5, the control unit 9 forms a response data upon receipt of the second expedited command.

At step S6, the control unit 9 transmits the response data that is formed to the first host control unit 2 through the first controllable interface 7. Upon receipt of the response data, the first host control unit 2 readily transmits the second expedited command to the data module 1, and the control unit 9 receives and processes the second expedited command. As the transmission of the second expedited command from the first host control unit 2 terminates, the control unit 9 returns back to step S2 and executes again the operations of step S2 and of subsequent steps.

At step S7, on the other hand, the control unit 9 turns the first controllable interface 7 off and turns the second controllable interface 8 on (first changed-over stage).

Next, at step S8, the control unit 9 judges whether the general purpose command is fed from the second host control unit 3 and is received through the second controllable interface 8. When it is judged that the general purpose command is received (Y), the routine proceeds to next step S9. When it is judged that the general purpose command has not been received (N), on the other hand, the routine proceeds to another step S13.

At step S9, the control unit 9 forms a response data upon receipt of the general purpose command.

At subsequent step S10, the control unit 9 transmits the response data that is formed to the second host control unit 3 through the second controllable interface 8. Upon receipt of the response data, here, the second host control unit 3 readily transmits the general purpose command to the data module 1, and the control unit 9 receives and processes the general purpose command. In this case, too, when the transmission of the general purpose command from the second host control unit 3 terminates, the control unit 9 returns back to step S2 and executes again the operations of step S2 and of subsequent steps.

At step S11, further, the control unit 9 judges whether the interface change-over signal that is fed is of the active level. When it is judged that the interface change-over signal is of the active level (Y), the routine returns back to step S4, and operations of step 4 and of subsequent steps are executed again. On the other hand, when it is judged that the interface change-over signal is of the non-active level (disable level) (N), the routine proceeds to next step S12.

Then, at step S12, the control unit 9 turns the first controllable interface 7 off and turns the second controllable interface 8 on (first changed-over state). After this operation, the routine returns back to step S2, and the operations of step S2 and of subsequent steps are executed again.

At step S13, the control unit 9 judges whether the interface change-over signal that is fed is of the non-active level (disable level). When it is judged that the interface change-over signal is of the non-active level (Y), the routine returns back to step S8, and the operations of step 8 and of subsequent steps are executed again. When it is judged that the interface change-over signal is of the active level (N), on the other hand, the routine proceeds to next step S14.

Next, at step S14, the control unit 9 turns the first controllable interface 7 on and turns the second controllable interface 8 off (second changed-over state). After this operation, the routine returns back to step S2, and the operations of step S2 and of subsequent steps are executed again.

According to the data transfer unit of this embodiment as described above, the data module becomes capable of receiving and processing the expedite command without exception, and of successively receiving and processing general purpose commands in a period other than the period of receiving the expedited command. It is thus allowed to obtain a data module featuring a high command receiving efficiency.

Though the above embodiment has dealt with an example in which the general purpose command was fed from the second host-control unit 3 at an interval of a period $T_0$ of 500 msec, it should be noted that the period $T_0$ of 500 msec for feeding the general purpose command is a preferred interval but is in no way limited to the interval of 500 msec only in this invention and may assume any other time interval.

The above embodiment has dealt with an example in which the interface change-over signal has assumed the active level at a moment 10 msec before the expedited command was supplied from the first host control unit 2. It is a preferred selection of time that the interface change-over signal has assumed the active level 10 msec before the expedited command was fed. According to this invention, however, the time at which the interface change-over signal assumes the active level needs not be necessarily set to be 10 msec earlier than when the expedited command is fed, but any other time close to 10 msec may be selected.

According to this invention as described above, the first and second on/off controllable interfaces in the data module are so changed over that the first interface is turned off and the second interface is turned on at all times. It is therefore made possible to receive, during the change-over period, the general purpose command that is arriving at a predetermined period from the second host control unit as well as to set the interface change-over signal to be of the active level that is fed to the data module just before the expedited command arrives. Accordingly, the first interface is turned on and the second interface is turned off, and the expedited command from the first host control unit can be received just after the change over. Namely, the data module becomes capable of receiving and processing the expedite command without exception, and of successively receiving and processing general purpose commands in a period other than the period of receiving the expedited command. It is thus allowed to obtain a data module featuring a high command receiving efficiency.

According to this invention, further, the change-over of the first and second interfaces has been completed based on the interface change-over signal of the active level that is fed at the time when the expedited command is fed to the data module and, hence, the expedited command can be reliably received and processed.

According to this constitution, the period of the active level of the interface change-over signal that is fed to the data module overlaps the period for feeding the expedited command. Therefore, means for changing over the first and second interfaces can be simply constituted and, besides, the change-over can be reliably accomplished to reliably receive and process the expedited command.

What is claimed is:

1. A data transfer unit comprising:
   a data module having at least a command module, and first and second on/off controllable interfaces; and
   first and second host control units; wherein
      an expedited command output at an indefinite period from the first host control unit is fed to the command module through the first interface;
      the first interface is turned off and the second interface is turned on at all times when a general purpose command output at a predetermined period from the second host control unit is fed to the command module through the second interface; and
      the first interface is turned on and the second interface is turned off by an interface change-over signal of an active level fed to the data module just before the first host control unit produces the expedited command.

2. A data transfer unit according to claim 1, wherein the first host control unit works to set the interface change-over signal to the active level 10 msec before the expedited command is output.

3. A data transfer unit according to claim 1, wherein the first host control unit works to maintain the interface change-over signal at the active level while the expedited command is being output.

4. A data transfer unit according to claim 1, wherein the second host control unit outputs the general purpose command at a predetermined period shorter than an indefinite period of the expedited command.

5. A data transfer unit according to claim 4, wherein the predetermined period of the general purpose command is 500 msec.

* * * * *